US010563819B2

(12) United States Patent
Durand et al.

(10) Patent No.: US 10,563,819 B2
(45) Date of Patent: Feb. 18, 2020

(54) SEALED AND THERMALLY INSULATING TANK COMPRISING AN ANGLE BRACKET

(71) Applicant: GAZTRANSPORT ET TECHNIGAZ, Saint Remy les Chevreuse (FR)

(72) Inventors: Francois Durand, Saint Remy les Chevreuse (FR); Guillaume Le Roux, Saint Remy les Chevreuse (FR); Johan Bougault, Saint Remy les Chevreuse (FR); Vincent Berger, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 45 days.

(21) Appl. No.: 16/025,330

(22) Filed: Jul. 2, 2018

(65) Prior Publication Data

US 2019/0011083 A1  Jan. 10, 2019

(30) Foreign Application Priority Data

Jul. 4, 2017  (FR) ...................................... 17 56313

(51) Int. Cl.
*F17C 3/02* (2006.01)
*B63B 25/16* (2006.01)
(Continued)

(52) U.S. Cl.
CPC .............. *F17C 3/027* (2013.01); *B63B 25/16* (2013.01); *B63B 27/25* (2013.01); *B67D 9/00* (2013.01);
(Continued)

(58) Field of Classification Search
CPC . F17C 3/027; F17C 3/06; B63B 25/16; B63B 27/25; B67D 9/00; F16L 59/141
See application file for complete search history.

(56) References Cited

U.S. PATENT DOCUMENTS

2007/0028823 A1* 2/2007 Yang ........................ B63B 25/14
  114/74 A
2017/0158291 A1* 6/2017 Heo .......................... B63B 25/16
(Continued)

FOREIGN PATENT DOCUMENTS

FR          3008765 A1    1/2015
WO    2017064413 A1    4/2017

*Primary Examiner* — P. Macade Nichols
(74) *Attorney, Agent, or Firm* — Notaro, Michalos & Zaccaria, P.C.

(57) ABSTRACT

Sealed and thermally insulating tank incorporated into a polyhedral bearing structure, a first bearing wall and a second bearing wall forming an edge corner, the tank having a first tank wall, a thermally insulating barrier and a sealed membrane, the tank further has an angle bracket with a first flange and a second flange in such a way that the angle bracket connects in a sealed manner. The sealed membrane of the first tank wall and the sealed membrane of the second tank wall in line with the edge corner, in which the angle bracket has a pair of first tabs and a pair of second tabs, the tank has a pair of first anchor rods coupled to a respective first tab and a pair of second anchor rods coupled to a respective second tab in such a way as to transmit a tensile load between the angle bracket.

16 Claims, 6 Drawing Sheets

(51) Int. Cl.
*B63B 27/25* (2006.01)
*B67D 9/00* (2010.01)
*F16L 59/14* (2006.01)
*F17C 3/06* (2006.01)

(52) U.S. Cl.
CPC .............. *F16L 59/141* (2013.01); *F17C 3/06* (2013.01); *F17C 2201/0157* (2013.01); *F17C 2203/035* (2013.01); *F17C 2203/0341* (2013.01); *F17C 2205/0355* (2013.01); *F17C 2221/035* (2013.01); *F17C 2223/0153* (2013.01); *F17C 2270/0105* (2013.01)

(56) References Cited

U.S. PATENT DOCUMENTS

2018/0299068 A1* 10/2018 Park .................. B63B 25/16
2018/0299069 A1* 10/2018 Park .................. F17C 3/04

* cited by examiner

SEALED AND THERMALLY INSULATING TANK COMPRISING AN ANGLE BRACKET

TECHNICAL FIELD

The invention relates to the field of sealed and thermally insulating tanks. In particular, the invention relates to the field of sealed and thermally insulating tanks in the context of the storage or transportation of low-temperature liquids, such as ship-borne tanks for transporting Liquefied Petroleum Gas (also referred to as LPG) at, for example, a temperature of between −50° C. and 0° C., or for transporting liquefied natural gas (LNG) at approximately −162° C. at atmospheric pressure.

TECHNOLOGICAL BACKGROUND

Liquefied gas tanks are known for example from document FR3008765. That document describes a methane tanker tank comprising a plurality of longitudinal tank walls and a plurality of transverse tank walls. Each wall of the tank comprises a double sealing membrane intercalated with a double insulating barrier.

When the liquefied gas is being loaded and offloaded, the change in temperature imposes high thermal deformations and therefore stresses on the sealed membranes of the tank. Likewise, during transport at sea, the movement of the liquefied gas in the tank applies strong forces to the insulating barriers and the membranes of the tank. In order to avoid impairment of the sealing of the tank, according to document FR3008765, the sealed membranes of the tank are anchored on the bearing structure using anchoring couplers in the zone where the longitudinal walls meet the transverse walls. The sealed membranes are connected to the coupler by composite beams fixed to an internal face of insulating box structures that form the thermally insulating barriers.

Document WO2017064413 describes a sealed and thermally insulating structure in particular for liquefied petroleum gas (LPG). In document WO2017064413, anchor strips are fixed to insulating edging blocks during prefabrication. The insulating edging blocks and the anchor strips mounted together are then aligned along the edge corner during fabrication of the tank in the bearing structure. The angle pieces of the membrane are welded on the anchor strips in a subsequent step.

SUMMARY

One idea underlying the invention is to have the tensile forces in the sealed membrane absorbed by couplers anchored on the bearing structure without applying high shear stresses to the elements that make up the thermally insulating barrier.

According to a mode of embodiment, the invention provides a sealed and thermally insulating tank incorporated into a polyhedral bearing structure, a first bearing wall of the bearing structure and a second bearing wall of the bearing structure forming an edge corner of the bearing structure, the tank comprising a first tank wall anchored on the first bearing wall and a second tank wall anchored on the second bearing wall, the tank walls comprising a thermally insulating barrier anchored on the corresponding bearing wall and a sealed membrane borne by said thermally insulating barrier.

According to a mode of embodiment, such a tank may comprise one or more of the following features.

According to a mode of embodiment, the tank further comprises an angle bracket, the angle bracket comprising a first flange borne by the thermally insulating barrier of the first tank wall and a second flange borne by the thermally insulating barrier of the second tank wall, an end portion of the sealed membrane of the first tank wall turned towards the edge corner being fixed in a sealed manner to the first flange of the angle bracket and an end portion of the sealed membrane of the second tank wall turned towards the edge corner being fixed in a sealed manner to the second flange of the angle bracket in such a way that the angle bracket connects in a sealed manner the sealed membrane of the first tank wall and the sealed membrane of the second tank wall in line with the edge corner, the angle bracket comprising a pair of first tabs each projecting from a respective end portion of the first flange in the direction of the first bearing wall and a pair of second tabs each projecting from a respective end portion of the second flange in the direction of the second bearing wall, the tank further comprising a pair of first anchor rods each comprising a first end and a second end opposite the first end, said first end being anchored to the second bearing wall and said second end being coupled to a respective first tab of the pair of first tabs, one, several or each of said first anchor rods extending from the second bearing wall in the direction of the corresponding first tab in order to transmit a tensile load between the angle bracket and the second bearing wall and retain the angle bracket on the thermally insulating barrier, the tank further comprising a pair of second anchor rods each comprising a first end and a second end opposite the first end, said first end being anchored on the first bearing wall and said second end being coupled to a respective second tab of the pair of second tabs, one, several or each of said second anchor rods extending from the first bearing wall in the direction of the corresponding second tab in order to transmit a tensile load between the angle bracket and the first bearing wall and retain the angle bracket on the thermally insulating barrier.

By virtue of these features, the same angle bracket connects in a sealed manner the sealed membranes of two tank walls while being coupled to each of the bearing walls bearing said tank walls. Such an angle bracket directly coupled to the bearing walls thus prevents stresses on the sealed membrane passing through the edging blocks on which it lies. Furthermore, since such an angle bracket is directly coupled to the two bearing walls forming the edge corner of the bearing wall, it may be correctly kept in position in the tank in relation to each of said bearing walls, and this angle bracket therefore does not need to be fixed onto the edging blocks other than by the anchor rods and can simply lie on said edging blocks. Such an angle bracket simply lying on the edging blocks under the action of the anchor rods makes it possible to limit workshop prefabrication and does not require any other step of fixing, for example by riveting, of the angle brackets on the edging blocks.

By virtue of these features, the angle bracket has good rigidity facilitating its placement on the edging blocks. Furthermore, such rigidity makes it possible to increase the levels of mechanical stress passing through the angle brackets.

According to a mode of embodiment, one said or each first tab projects from a lower face of the first flange facing the first bearing wall at a distance from a lateral edge of the first flange of the angle bracket forming one end of the first flange, and one said or each second tab projects from a lower face of the second flange facing the second bearing wall at a distance from a lateral edge of the second flange of the angle bracket forming one end of the second flange.

By virtue of these features, the lateral edge of the first flange may extend beyond the tab and therefore approach an adjacent element, for example the edge facing an adjacent angle bracket. Thus the space separating two adjacent angle brackets may be limited to facilitate producing a sealed connection along the edge corner between said adjacent angle brackets while also forming a sufficient space to allow an anchor rod to pass into this zone.

According to a mode of embodiment, a longitudinal edge of the first flange parallel to the edge corner projects beyond the first tabs in a direction perpendicular to the second bearing wall in such a way that said longitudinal edge of the first flange is further from the second bearing wall that said first tabs in said direction perpendicular to the second bearing wall, and/or a longitudinal edge of the second flange parallel to the edge corner projects beyond the second tabs in a direction perpendicular to the first bearing wall in such a way that said longitudinal edge of the second flange is further from the first bearing wall than said second tabs in said direction perpendicular to the first bearing wall.

By virtue of these features, the available surface area on the flange of the angle bracket for welding the sealed membrane may be enlarged and mounting tolerances can be managed more easily.

According to a mode of embodiment, the thermally insulating barrier of the first tank wall forms a first support surface on which the sealed membrane of the first tank wall lies, and the thermally insulating barrier of the first tank wall forms a first milling arranged at one end of the first support surface turned towards the edge corner, the first flange of the angle bracket being housed in said first milling in such a way that an upper face of the first flange of the angle bracket is flush with the first support surface; and the thermally insulating barrier of the second tank wall forms a second milling arranged at one end of the second support surface turned towards the edge corner, the second flange of the angle bracket being housed in said second milling in such a way that an upper face of the second flange of the angle bracket is flush with the second support surface.

By virtue of these features, the angle bracket and the thermally insulating barriers of the tank walls together form substantially planar and uniform surfaces for receiving the sealed membranes of said tank walls.

Such an angle bracket may be formed with different lengths. According to a mode of embodiment, the tank comprises a row of angle brackets juxtaposed and connected in a sealed manner in pairs along the edge corner.

According to a mode of embodiment, several, certain or all of the angle brackets in the row of angle brackets comprise a first flange borne by the thermally insulating barrier of the first tank wall and a second flange borne by the thermally insulating barrier of the second tank wall, an end portion of the sealed membrane of the first tank wall turned towards the edge corner being fixed in a sealed manner to the first flange of said angle brackets and an end portion of the sealed membrane of the second tank wall turned towards the edge corner being fixed in a sealed manner to said second flange of said angle brackets in such a way that said, several, certain or all of the angle brackets in the row connect in a sealed manner the sealed membrane of the first tank wall and the sealed membrane of the second tank wall in line with the edge corner, one, several or each of said angle brackets further comprising a pair of first tabs each projecting from a respective end portion of the first flange of said angle bracket in the direction of the first bearing wall and a pair of second tabs each projecting from a respective end portion of the second flange of said angle bracket in the direction of the second bearing wall, the tank comprising a row of first anchor rods each comprising a first end and a second end opposite the first end, a plurality of first anchor rods in the row of first anchor rods having a said first end anchored to the second bearing wall and a said second end coupled to at least one first tab of at least one angle bracket in the row of angle brackets, said first anchor rods extending from the second bearing wall in the direction of said at least one first tab in order to transmit a tensile load between said at least one angle bracket and the second bearing wall and retain said at least one angle bracket on the thermally insulating barrier, the tank further comprising a row of second anchor rods each comprising a first end and a second end opposite the first end, a plurality of second anchor rods in the row of second anchor rods having a said first end anchored on the first bearing wall and a said second end being coupled to at least one second tab of at least one angle bracket in the row of angle brackets, said second anchor rods extending from the first bearing wall in the direction of said at least one second tab in order to transmit a tensile load between said at least one angle bracket and the first bearing wall and retain said at least one angle bracket on the thermally insulating barrier.

According to a mode of embodiment, the second end of one said anchor rod is jointly coupled to two anchor tabs belonging to two adjacent angle brackets in said row of angle brackets to retain said two adjacent angle brackets on the thermally insulating barrier. Such an arrangement may be employed for one, several or all of the first anchor rods and/or for one, several or all of the second anchor rods. This arrangement makes it possible to use the anchor rod jointly for anchoring two angle brackets, which limits the number of anchor rods to be installed and the corresponding space occupied thereby.

According to a mode of embodiment, the thermally insulating barrier of the first tank wall comprises a row of first edging blocks anchored on the first bearing wall and juxtaposed along the edge corner, at least two of said first edging blocks each comprising a groove formed in the thickness of the first edging block from an upper face of the first edging block in such a way as to form a space accessible from the second bearing wall in the first edging block, the anchor rods of said pair of first anchor rods being housed in the grooves of the two first edging blocks, the first flange of the angle bracket being disposed overlapping said two first edging blocks in such a way that the first tabs of said angle bracket project into said grooves of the two edging blocks.

Such an insulating block may be formed in different ways and with different materials, notably in the form of blocks of insulating foam, for example polyurethane foam, or in the form of box structures filled with an insulating filling. According to a corresponding mode of embodiment, at least one of the first edging blocks comprises:

a bottom panel which is rectangular overall, a cover panel which is rectangular overall disposed parallel to the bottom panel plumb with the bottom panel, spacer elements, disposed between the bottom panel and the cover panel and extending in a thickness direction of the edging block between the bottom panel and the cover panel in such a way as to keep the cover panel at a distance from the bottom panel, an insulating filling disposed between the bottom panel and the cover panel and between the spacer elements, in such a way as to fill an internal space of the edging block, in which the cover panel has at least one cut-out opening on a transverse edge of the cover panel facing the second bearing wall at a position located between two longitudinal edges of the cover panel, a transverse side of the edging block facing the second bearing wall comprising at least one opening located in line with said at least one cut-out, the spacer elements and the insulating filling being disposed in such a way as to form a free space under said at least one cut-out of the cover panel and in line with said at least one opening on the transverse side of the edging block, said free space forming the groove formed in the thickness of said edging block. According to a mode of embodiment, the or each groove of the edging block may be formed using this structure comprising a cut-out in the cover panel and an opening on the side of the edging block. The insulating filling may be made of different materials, for example glass or rock wool, perlite, polymer foam, etc.

According to a mode of embodiment, the thermally insulating barrier of the second tank wall comprises a row of second edging blocks anchored on the second bearing wall and juxtaposed along the edge corner, at least two of said second edging blocks each comprising a groove formed in the thickness of the second edging block from an upper face of the second edging block in such a way as to form a space accessible from the first bearing wall in the second edging block, the anchor rods of said pair of second anchor rods being housed in the grooves of the two second edging blocks, the second flange of one angle bracket being disposed overlapping the two second edging blocks in such a way that the second tabs of said angle bracket project into said grooves of the two second edging blocks.

By virtue of these features, the anchor rods are not housed between the edging blocks. The distance between two adjacent edging blocks can thus be limited.

By virtue of these features, sealing of the sealed membrane is ensured in a corner of the tank.

The angle bracket may be formed in different ways, preferably from a metallic material.

According to a mode of embodiment, the flanges and the tabs of the angle bracket are attached to one another or formed from a single element in such a way that the angle bracket is one-piece. By one-piece, it is meant that the angle bracket is a single part or a plurality of parts which are pre-assembled for example by welding. According to a mode of embodiment, one angle bracket is made up of two anchor strips disposed respectively either side of the edge corner and of one or more angle pieces attached on the anchor strips in order to connect them in a sealed manner in line with the edge corner. Other modes of embodiment employing anchor strips are described below.

According to a mode of embodiment, the thermally insulating barrier of a first tank wall comprises a row of edging blocks anchored on the first bearing wall and juxtaposed along the edge corner in such a way as to form a support surface parallel to the first bearing wall, the tank comprising a row of anchor strips extending parallel to the edge corner, said anchor strips being borne by the first support surface and anchored to the second bearing wall by a row of anchor rods, one, several or each of said anchor rods comprising a first end anchored to the second bearing wall and a second end coupled to the row of anchor strips in order to transmit a tensile load between the row of anchor strips and the second bearing wall, an end portion of the sealed membrane of the first tank wall turned towards the edge corner being fixed in a sealed manner on said row of anchor strips, a first and a second of said edging blocks each comprising a groove formed in the thickness of said edging block from an upper face of said edging block in such a way as to form a space accessible from the second bearing wall in the edging block, a first and a second of said anchor rods being housed respectively in the groove of the first and of the second edging block, an anchor strip in the row of anchor strips is supported overlapping the first edging block and the second edging block, said anchor strip comprising a first tab and a second tab projecting respectively from two opposite end portions of the anchor strip in the direction of the first bearing wall, the first and second tabs being engaged respectively in the groove of the first edging block and of the second edging block and being respectively coupled to the first anchor rod and to the second anchor rod.

Such a tank in which the tabs of the anchor strip are housed in the grooves of the edging blocks does not require adaptation of the space between said edging blocks in order to house said anchor rods therein. It is thus possible to reduce the spacing between said edging blocks. The reduction in the space between two adjacent edging blocks may lead to a reduction in the insulation to be placed between said edging blocks and therefore a simplification of the industrial application and a limitation of industrial risk in the positioning.

Furthermore, the arrangement of the anchor rods in the grooves may offer greater freedom in positioning of the couplers allowing anchoring of the edging blocks on the bearing walls.

In some modes of embodiment, some or all of the edging blocks may comprise a groove formed in the thickness of said edging block from an upper face of said edging block such as to form a space accessible from the second bearing wall in the edging block, in such a way that all of said anchor rods or a majority of the latter are housed in said grooves.

According to a mode of embodiment, said first and second edging blocks have an equal length taken in a direction parallel to the edge corner, and the anchor strip supported overlapping the first edging block and the second edging block has a length taken in the direction parallel to the edge corner which is less than said length of the edging blocks.

According to a mode of embodiment, the groove of the first edging block constitutes a first groove, the first edging block further comprising a second groove formed in the thickness of said first edging block from the upper face of said edging block and spaced apart from the first groove along the edge corner in such a way as to form a second space accessible from the second bearing wall, a third of the anchor rods being housed in the second groove of said edging block, one anchor strip in the row of anchor strips is disposed only on the first edging block, said anchor strip comprising a first tab and a second tab projecting respectively from two opposite end portions of the anchor strip in the direction of the first bearing wall, the first and second tabs being engaged respectively in the first and second grooves of the first edging block and being respectively coupled to the first anchor rod and to the third anchor rod.

In some modes of embodiment, some or all of the edging blocks may comprise two grooves spaced apart from one another along the edge corner, one, several or each of said grooves accommodating one of said anchor rods.

In some modes of embodiment, the row of anchor strips and/or of angle brackets may comprise only anchor strips and/or angle brackets disposed overlapping several edging blocks or a combination of anchor strips and/or of angle brackets disposed overlapping several edging blocks and of anchor strips and/or of angle brackets disposed on only one edging block. These two arrangements of the anchor strips and/or of the angle brackets may be combined in different proportions. The row of anchor strips and/or of angle brackets may be made up of identical or different anchor strips and/or angle brackets and the row of edging blocks may be made up of identical or different edging blocks. In a mode of embodiment, the anchor strips and/or the angle brackets have a uniform length.

In a mode of embodiment, the edging blocks have a uniform length. In this case, the uniform length of the anchor strips and/or of the angle brackets may be a whole fraction or an integer multiple of the uniform length of the edging blocks. For example, in a mode of embodiment in which the uniform length of the anchor strips and/or of the angle brackets is half of the uniform length of the edging blocks, the anchor strips and/or the angle brackets are alternately disposed on only one edging block or overlapping several edging blocks. In a mode of embodiment, one anchor strip and/or one angle bracket may also overlap more than two edging blocks.

According to a mode of embodiment, the thermally insulating barrier of one second tank wall comprises a second row of edging blocks anchored on the second bearing wall and juxtaposed along the edge corner in such a way as to form a second support surface parallel to the second bearing wall,
the tank comprising a second row of anchor strips extending parallel to the edge corner, said anchor strips being borne by the second support surface and anchored to the first bearing wall by a second row of anchor rods, one, several or each of said anchor rods comprising a first end anchored to the first bearing wall and a second end coupled to the second row of anchor strips in order to transmit a tensile load between the second row of anchor strips and the first bearing wall, an end portion of the sealed membrane of the second tank wall turned towards the edge corner being fixed in a sealed manner on said second row of anchor strips,
a first and a second of said edging blocks in the second row each comprising a groove formed in the thickness of said edging block from an upper face of said edging block in such a way as to form a space accessible from the first bearing wall in the edging block, a first and a second of said anchor rods in the second row being housed respectively in the groove of the first and of the second edging block in the second row,
one anchor strip in the second row of anchor strips is supported overlapping the first edging block and the second edging block in the second row, said anchor strip comprising a first tab and a second tab respectively projecting from two opposite end portions of the anchor strip in the direction of the second bearing wall, the first and second tabs being engaged respectively in the groove of the first edging block and of the second edging block in the second row and being respectively coupled to the first anchor rod and to the second anchor rod in the second row.

According to a mode of embodiment, the grooves of the first and second edging blocks in the row of edging blocks of the first tank wall are located in front of the grooves of the first and second edging blocks in the second row of edging blocks in line with the edge corner, in such a way that the first anchor rod and the second anchor rod anchored to the first bearing wall respectively intersect the first anchor rod and the second anchor rod anchored to the second bearing wall.

According to a mode of embodiment, the tank further comprises angle pieces disposed on the edging blocks of the first tank wall and of the second tank wall, the angle pieces comprise two planar portions located in the planes of the sealed membrane of the first and second tank walls, said planar portions of said angle pieces being fixed in a sealed manner to at least one metal strip in the row of metal strips in such a way as to connect in a sealed manner the sealed membrane of the first tank wall and the sealed membrane of the second tank wall.

The angle pieces fixed in a sealed manner on the metal strips thus fulfil the same function as the angle bracket above and make it possible to connect in a sealed manner the sealed membranes of the two tank walls. Consequently, according to a mode of embodiment, an angle bracket and an assembly formed by one or more angle pieces fixed in a sealed manner on metal strips may be substituted one with the other, for example over part or all of an edge corner of the tank. The modes of embodiment of angle brackets may also be used in combination along an edge corner for example in an alternating manner, etc.

According to a mode of embodiment, the bearing structure comprises a third bearing wall on which is anchored the thermally insulating barrier of a third tank wall, said third tank wall comprising a sealed membrane lying on the thermally insulating barrier of said third tank wall, the third bearing wall forming with the first bearing wall and the second bearing wall a corner of the bearing structure located at one end of said edge corner,
the tank comprising a sealed corner piece comprising a first flange lying on the thermally insulating barrier of the first tank wall, a second flange lying on the thermally insulating barrier of the second tank wall and a third flange lying on the thermally insulating barrier of the third tank wall.

According to a mode of embodiment, the thermally insulating barrier of each of the first, second and third tank walls comprises a respective corner insulating block, said corner insulating blocks being joined in line with the corner of the bearing structure.

According to a mode of embodiment, the corner piece is adjacent to a last angle bracket or a last anchor strip in the row of angle brackets and/or of anchor strips, the first flange of the last angle bracket or anchor strip being connected in a sealed manner to the first flange of the corner piece and the second flange of the last angle bracket or anchor strip being connected in a sealed manner to the second flange of the corner piece.

According to a mode of embodiment, the corner insulating block of the first tank wall comprises a groove formed in the thickness of said corner insulating block of the first tank wall from an upper face of said corner insulating block of the first tank wall in such a way as to form a space accessible from the second bearing wall in said corner insulating block,
the corner insulating block of the second tank wall comprising a groove formed in the thickness of said corner insulating block of the second tank wall from an upper face of said corner insulating block of the second tank wall in such a way as to form a space accessible from the first bearing wall in said corner insulating block.

According to a mode of embodiment, a last angle bracket or anchor strip located at the end of the row of angle brackets and/or anchor strips of the first tank wall is disposed overlapping an edging block and the corner insulating block of the first tank wall, said end angle bracket or anchor strip comprising a tab projecting into the groove of said corner insulating block of the first tank wall and being coupled to a last anchor rod located at the end of the row of anchor rods in order to transmit a tensile load between said angle bracket or anchor strip and the second bearing wall, According to a mode of embodiment, a last angle bracket or anchor strip located at the end of the second row of angle brackets and/or anchor strips of the second tank wall is disposed overlapping an edging block and the corner insulating block of the second tank wall, said end angle bracket or anchor strip comprising a tab projecting into the groove of said corner insulating block of the first tank wall and being coupled to a last anchor rod located at the end of the row of anchor rods in order to transmit a tensile load between said angle bracket or anchor strip and the first bearing wall.

According to a mode of embodiment, the tank further comprises a corner anchor rod having a first end anchored on the bearing structure in the corner of the bearing structure and a second end attached to the corner piece in order to transmit a tensile load between the corner piece and the bearing structure and retain the corner piece on the thermally insulating barriers of the first, second and third tank walls, said corner anchor rod extending in a central direction of the solid angle formed by the corner of the bearing structure and being attached to a central zone of the corner piece located at the point of connection between the first, second and third flanges of the corner piece.

According to a mode of embodiment, the corner piece comprises a hollow cylindrical base which is open in the central zone of the corner piece, said base having a perforated bottom, the second end of the corner anchor rod passing through the perforated bottom and being housed in said hollow base in such a way as to retain said base on the bearing structure, a metal corner plate being fixed in a sealed manner on the corner piece in such a way as to block in a sealed manner the opening of the base. Coupling of the corner piece with the corner anchor rod is thus simple to achieve through the opening of the base while maintaining sealing of the corner piece by means of the metal corner plate.

According to a mode of embodiment, the last angle bracket comprises, at one end of the first flange connected in a sealed manner to the first flange of the corner piece, a third tab, a last first anchor rod in the row of first anchor rods being coupled to one of the tabs of the pair of tabs of the first flange located at said end of said first flange and to said third tab, and in which the last angle bracket comprises, at one end of the second flange connected in a sealed manner to the second flange of the corner piece, a fourth tab, a last second anchor rod in the row of second anchor rods being coupled to one of the tabs of the pair of tabs of the second flange located at said end of said flange and to said fourth tab.

Such a tank may form part of an onshore storage facility, for example for storing LPG or may be installed in an inshore or deep-water floating structure, notably a methane tanker, a floating storage and regasification unit (FSRU), a floating production storage and offloading (FPSO) unit, or the like.

According to a mode of embodiment, the invention also provides a ship for transporting a cold liquid product, the ship comprising a double hull and an abovementioned tank disposed in the double hull.

According to a mode of embodiment, the invention also provides a method for loading or offloading such a ship, in which a cold liquid product is conveyed through insulated pipelines from or to a floating or onshore storage facility to or from the tank of the ship.

According to a mode of embodiment, the invention also provides a system for transferring a cold liquid product, the system comprising the abovementioned ship, insulated pipelines arranged in such a way as to connect the tank installed in the hull of the ship to a floating or onshore storage facility and a pump for causing a cold liquid product to flow through the insulated pipelines from or to the floating or onshore storage facility to or from the tank of the ship.

BRIEF DESCRIPTION OF THE DRAWINGS

The invention will be better understood, and other objects, details, features and advantages thereof will become more clearly apparent during the course of the following description of a number of particular modes of embodiment of the invention which are given solely by way of nonlimiting illustration with reference to the appended drawings.

DETAILED DESCRIPTION OF MODE OF EMBODIMENT

The drawings are described hereafter in the context of a bearing structure formed by the internal walls of a double hull of a ship for transporting liquefied gas. Such a bearing structure has a polyhedral geometry, for example a prismatic shape. Such a bearing structure comprises for example longitudinal walls extending parallel to the longitudinal direction of the ship and forming a polygonal cross section in a plane perpendicular to the longitudinal direction of the ship. These longitudinal walls meet at longitudinal edge corners, which form for example angles of the order of 135° in an octagonal geometry. The general structure of such polyhedral tanks is for example described in relation to FIG. 1 of document FR3008765.

These longitudinal walls are interrupted in the longitudinal direction of the ship by transverse bearing walls which are perpendicular to the longitudinal direction of the ship. The longitudinal walls and the transverse walls meet at front and rear edge corners.

Each wall of the bearing structure bears a respective tank wall. Each of the tank walls comprises at least one thermally insulating barrier bearing a sealing membrane in contact with a fluid stored in the tank such as liquefied natural gas (LNG), or liquefied petroleum gas comprising butane, propane or propene, etc.

By convention, the adjective "upper" applied to an element of the tank denotes the part of that element oriented towards the interior of the tank and the adjective "lower" denotes the part of that element oriented towards the outside of the tank, regardless of the orientation of the wall of the tank in relation to the earth's gravitational field. Likewise, the term "above" denotes a position located closer to the interior of the tank and the term "below" denotes a position located closer to the bearing structure, regardless of the orientation of the wall of the tank in relation to the earth's gravitational field. Furthermore, since the tank walls have a similar structure, the description of one element of one tank wall described hereinafter applies by analogy to the other tank walls. The following description of FIGS. 1 to 8 is thus given in the context of a 90° angle of the tank, but this description is equally applicable by analogy to tank angles having other configurations such as forming angles at 135°.

Figure 1:
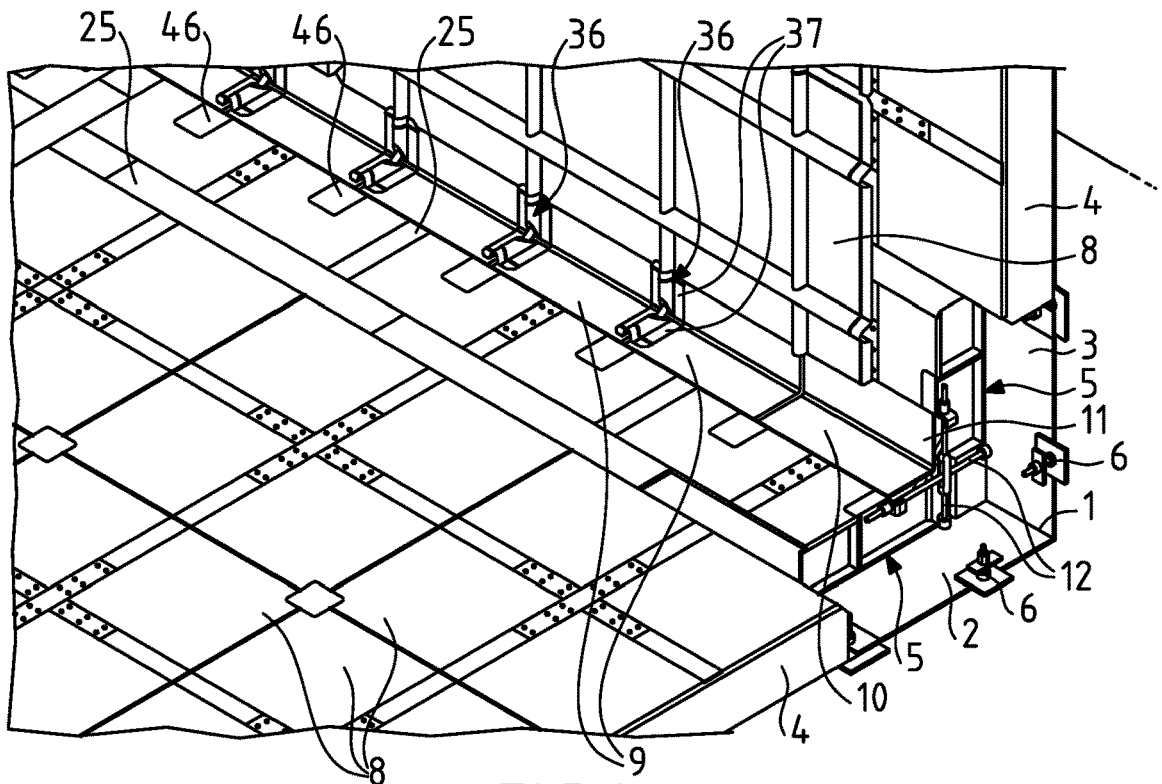
FIG. 1 is a schematic perspective view of a sealed and thermally insulating tank in relation to an angle of 90° formed by two walls of said tank in which the sealing membrane of one of the tank walls is not depicted.

FIG. 1 illustrates a tank angle at an edge corner 1, front or rear, between a longitudinal bearing wall 2 and a transverse bearing wall 3 of the bearing structure forming an angle of the order of 90°. A longitudinal tank wall is anchored on the longitudinal bearing wall 2 and a transverse tank wall is anchored on the transverse bearing wall 3.

The thermally insulating barrier of the longitudinal tank wall is made up of a plurality of insulating elements anchored on the whole longitudinal bearing wall 2. These insulating elements together form a planar surface on which the sealing membrane of the longitudinal tank wall is anchored. These insulating elements comprise a plurality of universal insulating elements 4 juxtaposed in a regular rectangular grid pattern. The thermally insulating barrier of the longitudinal tank wall also comprises a row of edging insulating elements 5 described below in relation to FIGS. 3 and 4, disposed along the edge corner 1. The insulating elements 4, 5 are anchored on the bearing structure by any suitable means, such as for example using anchor members 6. Such anchor members 6 may be formed in many ways and are for example described in document WO2017064413.

Figure 2:
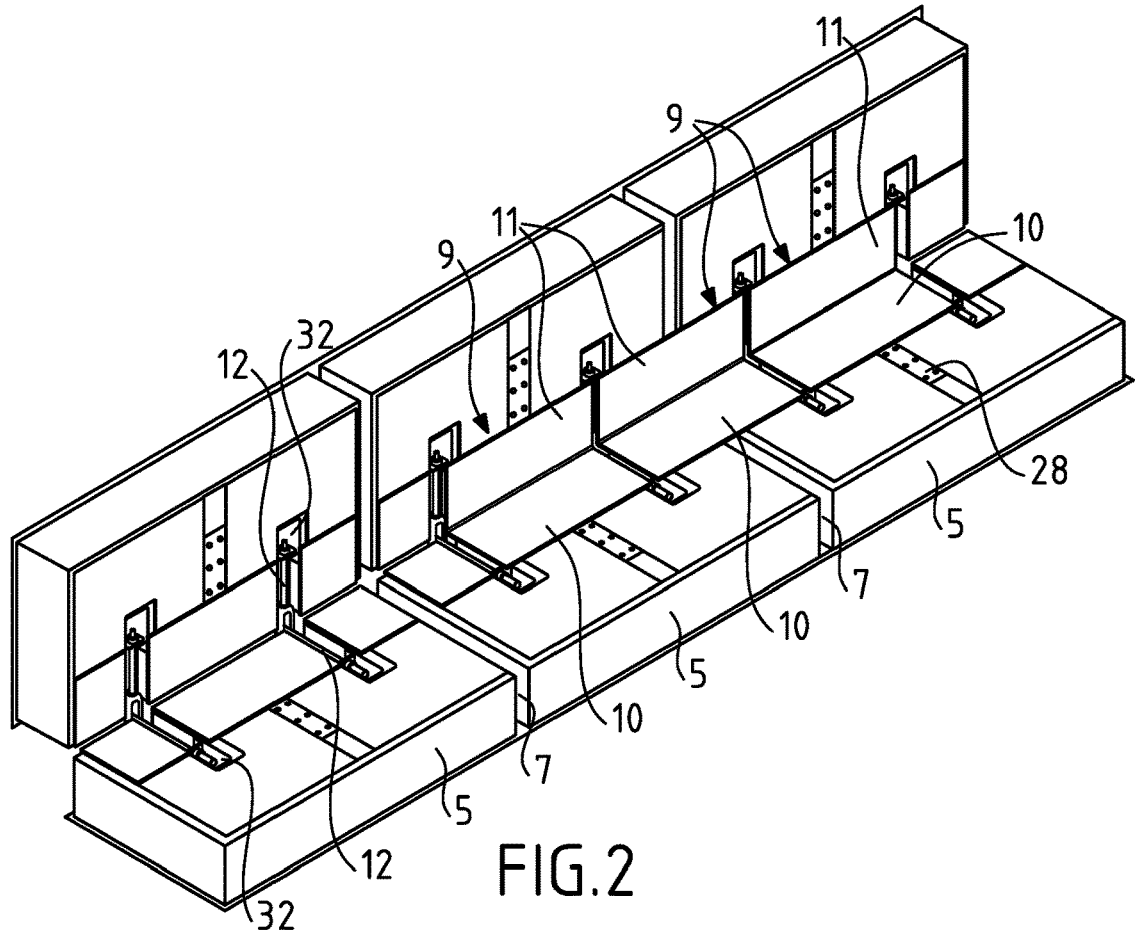
FIG. 2 is a detail view of the sealed and thermally insulating tank in FIG. 1 illustrating a plurality of edging insulating elements and angle brackets at said angle of the tank.

The insulating elements 4, 5 lie on the longitudinal bearing wall 2 with the interposition of mastic beads (not depicted) forming parallel straight or undulating lines. A plurality of intermediary spaces 7 separate into pairs the adjacent edging insulating elements 5. The intermediary spaces 7 of two tank walls in line with the edge corner 1 are preferably aligned as shown in FIG. 2.

The sealing membrane of the longitudinal tank wall is made up of a plurality of metal sheets 8 juxtaposed with one another with overlap. These metal sheets 8 preferably have a rectangular shape. The metal sheets 8 are welded together in order to ensure sealing of the sealing membrane. The metal sheets 8 are for example made of stainless steel with a thickness of 1.2 mm.

In order to allow the sealing membrane to deform in response to the various stresses experienced by the tank, in particular in response to the thermal contraction resulting from the loading of liquefied gas into the tank, the metal sheets 8 have a plurality of corrugations oriented towards the inside of the tank. More particularly, the sealing membrane of the tank wall comprises two series of perpendicular corrugations forming a regular rectangular pattern. Preferably, the corrugations extend parallel to the edges of the rectangular metal sheets 8.

In order to connect the sealed membrane of the longitudinal tank wall and the sealed membrane of the transverse tank wall, the tank comprises a row of metal angle brackets 9 arranged in line with the edge corner 1. These angle brackets 9 are aligned along the edge corner 1. These angle brackets 9 are connected in a sealed manner in pairs along the edge corner 1 in such a way as to ensure sealing of the sealed membrane in line with the edge corner 1.

As shown in FIGS. 1 and 2, the angle brackets 9 comprise a first flange 10 and a second flange 11. Said first flange 10 extends parallel to the longitudinal bearing wall 2. This first flange 10 lies on one or more edging insulating elements 5 of the longitudinal tank wall. Likewise, the second flange 11 lies on one or more edging insulating elements 5 of the transverse tank wall and extends parallel to the transverse bearing wall 3. One end of the sealed membrane of the longitudinal tank wall is anchored in a sealed manner, for example by means of lap welding, on the first flanges 10 in the row of angle brackets 9. Likewise, one end of the sealed membrane of the transverse tank wall is anchored on the second flanges 11 in the row of angle brackets 9.

Furthermore, the angle bracket 9 is anchored on the bearing walls 2, 3 forming the edge corner 1 by means of anchor rods 12 shown in FIG. 1. Each of these anchor rods 12 comprises a first end anchored on a respective bearing wall 2, 3 and a second end coupled to two corresponding adjacent angle brackets 9 in order to transmit the tensile loads to which said angle brackets 9 are subjected directly to said bearing wall. These anchor rods 12 extend parallel to the bearing wall on which they are not anchored forming the edge corner 1. In other words, the anchor rods 12 anchored on the longitudinal bearing wall 2 extend parallel to the transverse bearing wall 3 and vice versa. Such anchor rods 12 are for example described in document WO2017064413 in relation to FIGS. 4 to 6, 9, 14 and 16.

Figure 3:
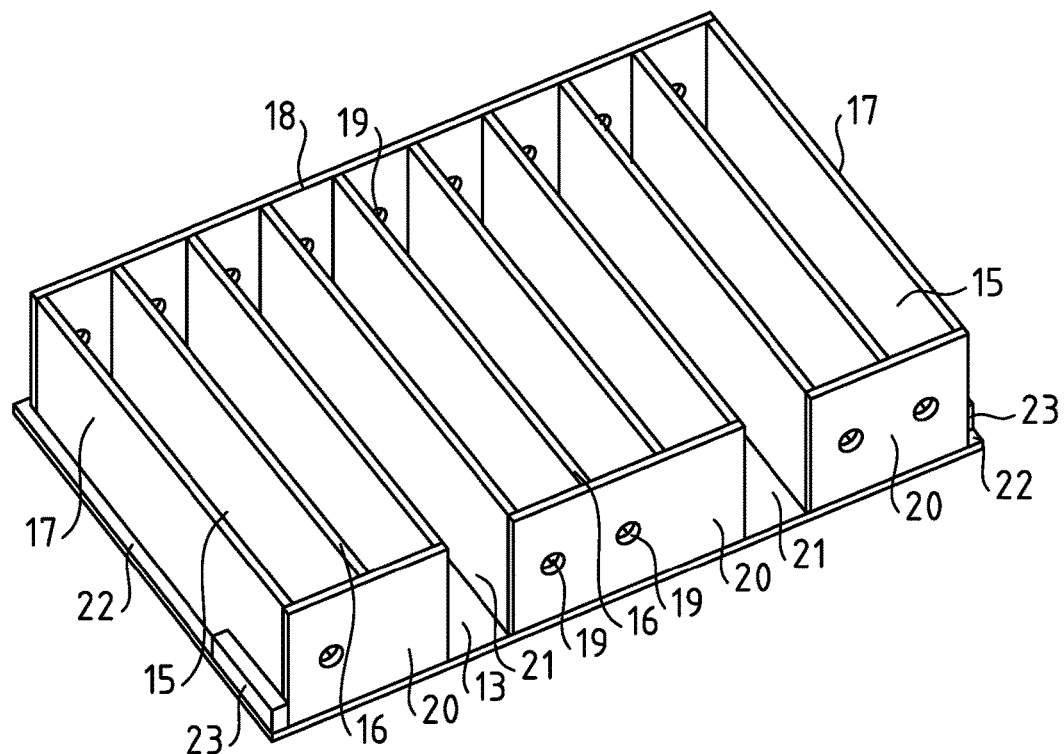
FIG. 3 is a schematic perspective view of an edging insulating element in FIG. 2 in which the cover panel is not depicted.
Figure 4:
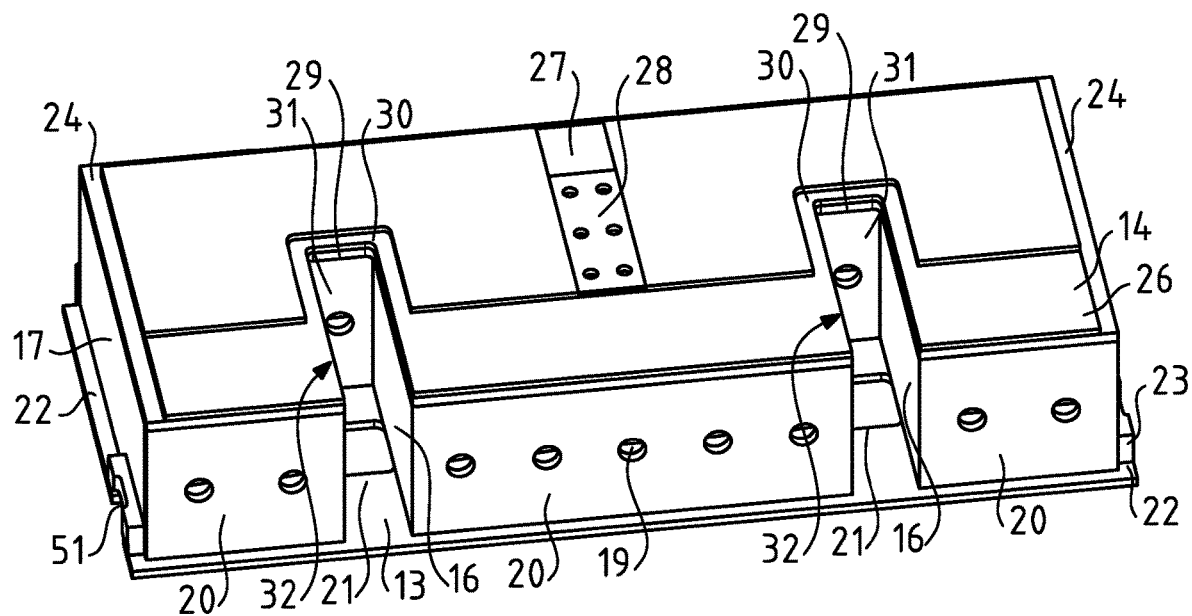
FIG. 4 is a schematic perspective view of the edging insulating element in FIG. 3 illustrating the cover panel of said edging insulating element.

FIGS. 3 and 4 show an edging insulating element 5 used to form the rows of edging insulating elements 5 shown in FIGS. 1 and 2. This edging insulating element 5 is described in the context of an edging insulating element of a longitudinal wall at the edge corner 1, and its features can be applied by analogy to other edging insulating elements 5 of the tank.

The edging insulating element 5 comprises a bottom panel 13, side panels and a cover panel 14. All of these panels have a rectangular shape and together define an internal space of the edging insulating element 5 in which an insulating filling 15 is housed. This insulating filling 15 is preferably non-structural, for example perlite or glass wool.

The bottom panel 13 and the cover panel 14 extend parallel to one another and, as shown in FIG. 2, parallel to the longitudinal bearing wall 2 on which they are anchored. The side panels extend perpendicularly to the bottom panel 13. The side panels connect the bottom panel 13 and the cover panel 14 in such a way as to form an insulating box structure which has a parallelepiped shape overall. Bearing spacers 16 are disposed between the bottom panel 13 and the cover panel 14 in the internal space of the edging insulating element 5. The panels and the bearing spacers 16 are attached by any suitable means, for example clips, screws, nails or the like.

These bearing spacers 16 extend perpendicularly to the transverse bearing wall 2 and perpendicularly to the longitudinal bearing wall 3 forming the edge corner 1. These bearing spacers 16 are spaced in pairs with a regular pitch. Furthermore, longitudinal side panels 17 forming the longitudinal edges of the edging insulating element 5 are arranged parallel to the bearing spacers 16. These longitudinal side panels 17 are spaced with the regular pitch of adjacent bearing spacers 16.

A first transverse side of the edging insulating element 5 facing the universal insulating elements 4 is formed by a first transverse side panel 18 extending parallel to the transverse bearing wall 2. This first transverse side panel 18 comprises through-orifices 19 intended to allow an inert gas to circulate in the thermally insulating barrier.

A second side of the edging insulating element 5 parallel to and facing the transverse bearing wall 3 is formed by three unconnected plates 20. Each of these plates 20 extends parallel to the transverse wall 3. Furthermore, edges of these plates 20 are arranged in line with bearing spacers 16 or with longitudinal side panels in such a way as to lie flush with said bearing spacers 16 or said longitudinal side panels 17. The bearing spacers 16 in line with which two adjacent plates 20 are arranged are also adjacent, such that the plates 20 are separated in pairs with the regular pitch separating two adjacent bearing spacers 16. In other words, the second side of the edging insulating element 5 has two openings 21 defined by the plates 20 and corresponding to the spacing between two adjacent bearing spacers 16 in line with which the edges of said plates 20 are arranged.

The bottom panel 13 comprises rims 22 projecting from the longitudinal side panels 17 and from the first transverse side panel 18. Cleats 23 are borne by the rims 22 and collaborate with anchor members 6 allowing anchoring of the edging insulating element 5 on the bearing wall. Such rims 22, cleats 23 and anchor members 6 may be formed in many ways and are for example described in document WO2017064413.

As shown in FIG. 4, the cleat 23 and the rim 22 on which said cleat 23 lies may comprise in their thickness a recess 51. This recess 51 extends in the length direction of the insulating elements over the whole thickness of the cleat 23 and over the whole thickness of the rim 22. The recesses 51 of two adjacent edging insulating elements 5 thus form a shaft allowing a stud of the anchor member 6 to be housed. This arrangement of the cleat 23 and of the rim 22 thus allows a reduction in the space required between said adjacent edging insulating elements 5.

The cover panel 14 comprises, on an upper face opposite the insulating filling 15, steps 24 on each side of the edging insulating element 5 having a rim 22. These steps 24 are located in line with the corresponding side panels 17, 18 and form a support zone for bridging elements 25 disposed between two adjacent insulating elements 4, 5 in order to form a continuous support surface for the sealed membrane. Such steps 24 and such bridging elements 25 may be formed in many ways and are for example described in document WO2017064413.

The upper face of the cover panel 14 further comprises a transverse milling 26 and a longitudinal milling 27.

The transverse milling 26 extends in a direction parallel to the transverse bearing wall over the whole length of the cover panel 14 in said direction parallel to the edge corner 1. The transverse milling 26 extends from one edge of the cover panel 14 located in line with the plates 20 defining the second side of the edging insulating element 5. This transverse milling 26 extends for example over a distance substantially equal to one third of the width of the cover panel 14 in a direction perpendicular to the transverse bearing wall 3.

The longitudinal milling 27 extends in a direction perpendicular to the transverse bearing wall 3 and connects the step 24 in line with the first transverse side panel 18 and the transverse milling 26. Preferably, this longitudinal milling 27 is centred on the cover panel 14 in a direction parallel to the edge corner 1. A longitudinal anchor strip 28 is disposed in this longitudinal milling 27 in order to anchor, for example by lap welding, two adjacent metal plates 8 of the sealed membrane of the tank wall.

The cover panel 14 also has two cut-outs 29 located in line with the openings 21 on the second side of the edging insulating element 5. These cut-outs 29 extend in a direction perpendicular to the transverse wall 3 by more than the width of the transverse milling 26 taken in this same direction. The transverse milling 26 is extended around the cut-out 29 by a respective milling 30 surrounding said cut-out 29 beyond the transverse milling 26 in said direction perpendicular to the transverse bearing wall 3. Closure plates 31 connect the cover panel 14 and the bottom panel 13 between the adjacent bearing spacers 16 located in line with the cut-outs 29. Thus, the edging insulating element 5 has two grooves 32 formed in the thickness of said edging insulating element 5 and each defined by the opening 21, the cut-out 29, the adjacent bearing spacers 16 flush with the opening 21 and the closure plate 31. These grooves 32 are preferably centred between the longitudinal milling 27 and the longitudinal side panels 17. The groove 32 has dimensions allowing an anchor rod 12 to be housed. Preferably, the insulating filling 15 is disposed in the edging insulating element 5 between the adjacent bearing spacers 16 except for the adjacent bearing spacers 16 defining the grooves 32 in order to allow anchor rods 12 to be housed in said grooves 32.

Many methods may be used in order to form the cover panel 14. In the mode of embodiment shown in FIG. 4, sheets of plywood having different dimensions are stacked in order to form the cover panel 14 having the steps 24 and the millings 26, 27, 30. In a mode of embodiment which is not depicted, the cover panel 14 is formed by a sheet of plywood in which the steps 24 and the millings 26, 27, 30 are directly formed.

Figure 5:
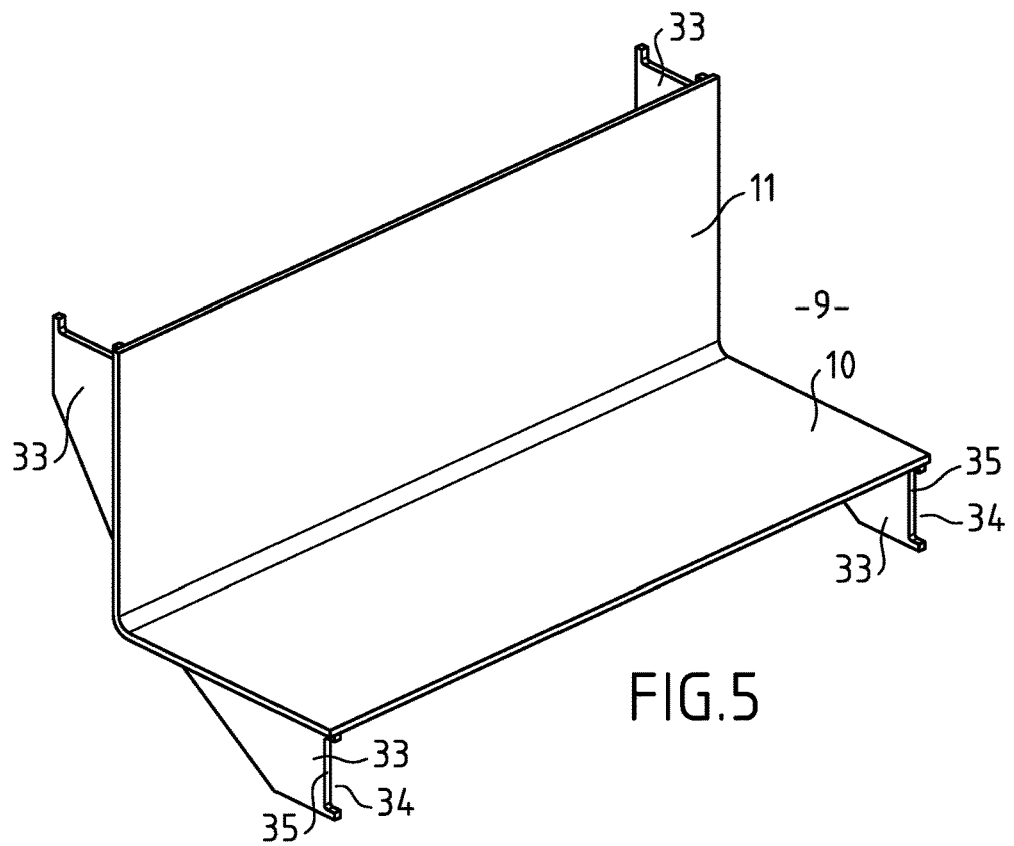
FIG. 5 is a schematic perspective view of an angle bracket.

As shown in FIG. 5, each flange 10, 11 of the angle bracket 9 has a pair of tabs 33, for example pre-assembled by welding on the flanges 10, 11 or obtained by folding a single piece of sheet metal. The tabs 33 of each pair of tabs 33 are disposed at opposing lateral ends of the flange 10, 11 and are therefore spaced apart from one another along the edge corner 1. It will be understood from the fact that the tabs are disposed at the lateral ends that said tabs 33 are closer to the edges of the flange 10, 11 than to the middle of the flange 10, 11 in a direction parallel to the edge corner 1. These tabs 33 project from a lower face of the flange 10, 11 perpendicularly to said flange 10, 11. One end of the tab 33 opposite the point of connection between the flanges 10, 11 has a cut-out 34. A bottom 35 of this cut-out 34 extends perpendicularly to the flange 10, 11 from which said tab 33 projects. These tabs 33 of the first flange 10 may be coplanar with a corresponding tab 33 of the second flange 11. Advantageously, the tabs 33 of the first flange 10 and the tabs 33 of the second flange 11 are formed in a continuous manner. Such tabs 33 which are continuous with the flanges 10, 11 increase the rigidity of the angle bracket 9. In another mode of embodiment, the tabs 33 of the flanges 10, 11 are discontinuous at the edge corner.

As shown in FIG. 2, the angle brackets 9 have a dimension in a direction parallel to the edge corner 1 equal to half of the dimension of the edging insulating elements 5 in the same direction. The row of angle brackets 9 thus comprises alternating angle brackets 9 lying on two adjacent edging insulating elements 5 and angle brackets 9 lying on only one of said edging insulating elements 5.

Moreover, the flanges 10 of the angle brackets 9 have a length in a direction perpendicular to the transverse bearing wall 3 substantially equal to the length of the transverse millings 26 of the edging insulating elements 5 on which said flanges 10 lie in this same direction. The flanges 10 are housed in and have a thickness substantially equal to the depth of the transverse millings 26 such that an upper face of the flanges 10 is flush with an upper face of the cover panel 14 and of the longitudinal anchor strips 28. As shown in FIG. 1, bridging plates 46 similar to the bridging plates 25 are disposed in the milling 30 surrounding the grooves 32 and flush with the upper face of the cover panel 14. Thus, the flanges 10, the longitudinal anchor strip 28 and the upper face of the cover panel 14 and the bridging plates 46 together form a substantially planar and continuous support surface for receiving the end of the sealed membrane of the longitudinal tank wall. The flanges 11 of the angle brackets 9 are arranged in a similar manner on the edging insulating elements of the transverse tank wall.

The angle brackets 9 are arranged on the edging insulating elements 5 in such a way that the tabs 33 of one angle bracket 9 are housed in a respective groove 32 of a corresponding edging insulating element 5 on which said angle bracket 9 lies. Thus, the tab 33 projects from a flange 10, 11 and passes through a cut-out 29 of the cover panel 14 on which said flange 10, 11 lies. Furthermore, since the angle brackets 9 are juxtaposed along the edge corner 1, the same groove 32 houses a respective tab 33 of each of the two adjacent angle brackets 9 which meet in said groove 32.

Figure 6:
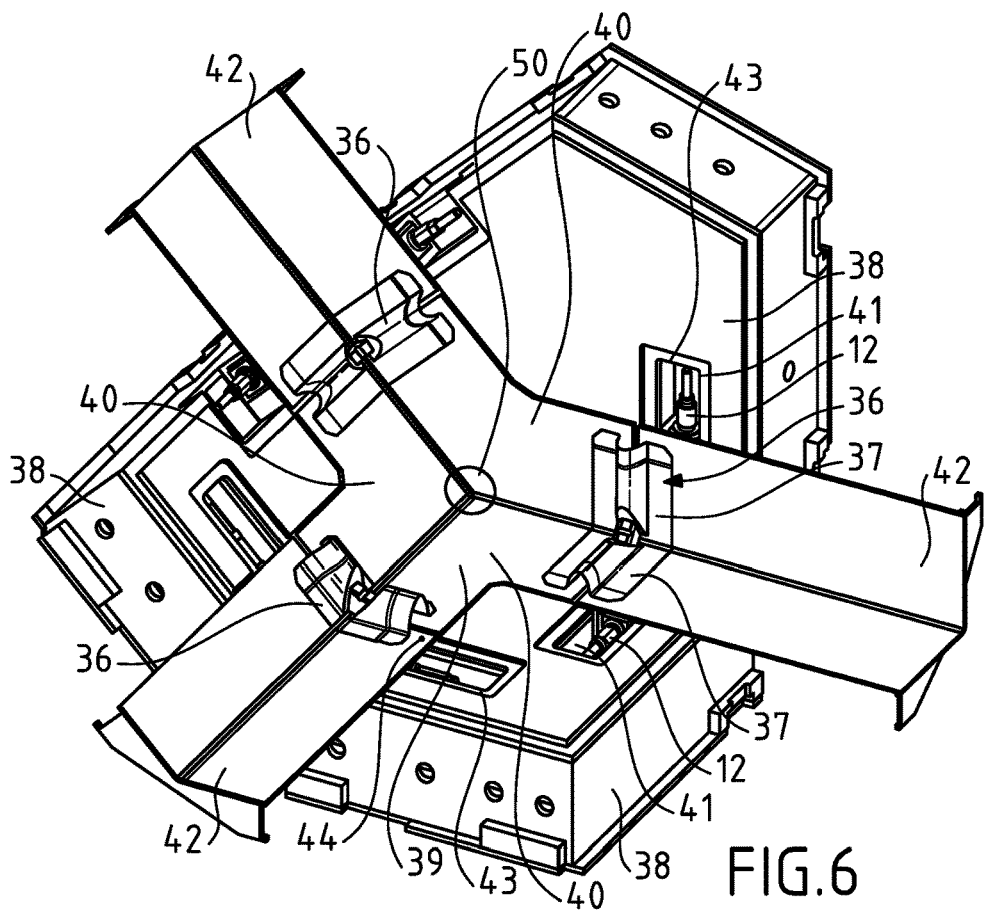
FIG. 6 is a schematic perspective view of a corner structure at the point of connection of three walls of the tank in FIG. 1.

Preferably, the tabs 33 project from the flanges 10, 11 at a distance from the edges of the flanges 10, 11 in such a way that the end of the flange 10, 11 forming said edge at least partially covers the cut-out 29. This arrangement allows two adjacent angle brackets 9 to cover as far as possible the cut-outs 29 of the edging insulating elements 5 on which they lie and therefore makes it possible to reduce the space required for connecting in a sealed manner said adjacent angle brackets 9. The sealed connection between two adjacent angle brackets 9 may be achieved in many ways, for example by means of a corrugated connecting piece 36 such as shown in FIG. 6. Such corrugated connecting pieces 36 comprise two planar bases 37 surrounding a corrugation and forming an angle corresponding to the angle of the angle brackets 9. These planar bases 37 are for example lap welded on the ends of the adjacent angle brackets 9.

As shown in FIG. 1, each groove 32 furthermore houses an anchor rod 12. Preferably, as shown in FIG. 1, the edging insulating elements 5 anchored on the transverse bearing wall 3 are aligned with the edging insulating elements 5 anchored on the longitudinal bearing wall in such a way that the grooves 32 of said edging insulating elements 5 are aligned in a plane perpendicular to the edge corner 1. Thus, the anchor rods 12 anchored on the longitudinal bearing wall 2 intersect the anchor rods 12 anchored on the transverse bearing wall 3.

The anchor rods 12 are coupled with the tabs 33 housed in said grooves 32. Thus, the flanges 10, 11 of one angle bracket 9 are anchored by means of two anchor rods 12 housed in respective grooves 32 formed in the edging insulating element(s) 5 on which said flange 10, 11 of the angle bracket 9 lies. Collaboration between the anchor rods 12 such as to couple the tabs 33 and the anchor rods 12 may be achieved in many ways, for example in a similar way to collaboration between the anchor rods and the tabs described in document WO2017064413, which is to say using an end of the anchor rod comprising a U-shaped hook each branch of which collaborates with the bottom 35 of a tab 33.

Since the anchor rods 12 are housed in the grooves 32 formed in the edging insulating elements 5, advantageously there is no need for the space between the edging insulating elements 5 to be set at a size for housing said anchor rods 12. Thus, the distance between two edging insulating elements 5 along the edge corner 1 may be reduced simply to the distance required for housing the anchor members 6 of the edging insulating elements 5, for example the distance is approximately 50 mm.

Furthermore, since the angle brackets 9 are directly anchored on each of the bearing walls 2, 3 forming the edge corner 1 via the anchor rods 12, it is not necessary to fix said angle brackets on the edging insulating elements 5. Thus, the angle brackets 9 may lie directly in the transverse millings 26 and do not need to be anchored on the edging insulating elements 5 by means of screwing, riveting, or the like.

In a mode of embodiment which is not depicted, the angle brackets 9 have a length in a direction parallel to the edge corner 1 which is identical to the length of the edging insulating elements 5 in the same direction. Furthermore, each edging insulating element 5 comprises only a single groove 32 centred in this direction parallel to the edge corner 1. Thus, the longitudinal milling 27 is disposed in line with the groove 32 and extends the milling 30 surrounding the groove 32.

Advantageously, in this mode of embodiment which is not depicted, each flange 10, 11 of the angle brackets 9 overlaps two adjacent edging insulating elements 5 in such a way that the tabs 33 of said flange 10, 11 are each housed in a groove 32 of one of the edging insulating elements 5 on which said flange 10, 11 lies.

In another mode of embodiment which is not depicted, the angle brackets 9 have a length in a direction parallel to the edge corner 1 which is identical to the length of the edging insulating elements 5 in this same direction. Moreover, the edging insulating elements 5 do not comprise any grooves 32 and the anchor rods 12 are housed between the adjacent edging insulating elements 5 in a similar way to that described in document WO2017064413. This mode of embodiment necessitates sufficient spacing between the edging insulating elements 5 in order to house the anchor rods 12 but does not require anchoring of the angle bracket 9 on the edging insulating elements 5, thus allowing simple mounting of the sealed membranes in line with the edge corners.

In another mode of embodiment which is not depicted, the angle brackets 9 have a length in a direction parallel to the edge corner 1 which is equal to half of the length of the edging insulating elements 5 in this same direction. Moreover, the edging insulating element 5 has a single groove 32 centred on said edging insulating element 5 in this same direction. Furthermore, anchor rods 12 are disposed both in the grooves 32 formed in the edging insulating elements 5 and between said edging insulating elements 5. Each angle bracket 9 lies on a respective edging insulating element 5 and has on the one hand a tab 33 housed in the groove 32 of said edging insulating element 5 and coupled with the anchor rod 12 housed in said groove 32 and, on the other hand, a tab 33 housed in the space between said edging insulating element 5 and an adjacent edging insulating element collaborating with an anchor rod 12 housed in said space.

FIG. 6 shows a tank corner at the point of connection between two longitudinal bearing walls 2 and a transverse bearing wall 3. The thermally insulating barrier of each of the tank walls comprises a corner insulating element 38 extending the rows of edging insulating elements 5 along the edge corners of the bearing walls 2, 3 meeting at said corner. One corner piece 39 lies on the corner insulating elements 38. This corner piece 39 comprises three corner flanges 40 each extending in a plane parallel to a respective bearing wall 2, 3 and lying on a corner insulating element 38 of a corresponding tank wall. This corner piece 39 is anchored in the corner of the bearing structure by a single corner anchor rod.

Only features of the corner insulating element 38 of a longitudinal tank wall are described hereinafter, this description applying by analogy to the other corner insulating elements 38 of the other tank walls. Likewise, collaboration between one corner flange 40 lying on said corner insulating element 38 and the row of angle brackets 9 along the edge corner 1 described hereinafter applies by analogy to collaboration between the other corner flanges 40 and the other rows of angle bracket 9 along the other edge corners forming the corner.

The corner insulating element 38 illustrated in FIG. 6 comprises in its thickness a groove 41 facing the transverse bearing wall 3 similar to the grooves 32 described above. Furthermore, this corner insulating element 38 comprises a corner milling extending, along the edge corner 1, the transverse milling 26 of the edging insulating elements 5 in which the angle brackets 9 are housed along the edge corner 1.

Figure 7:
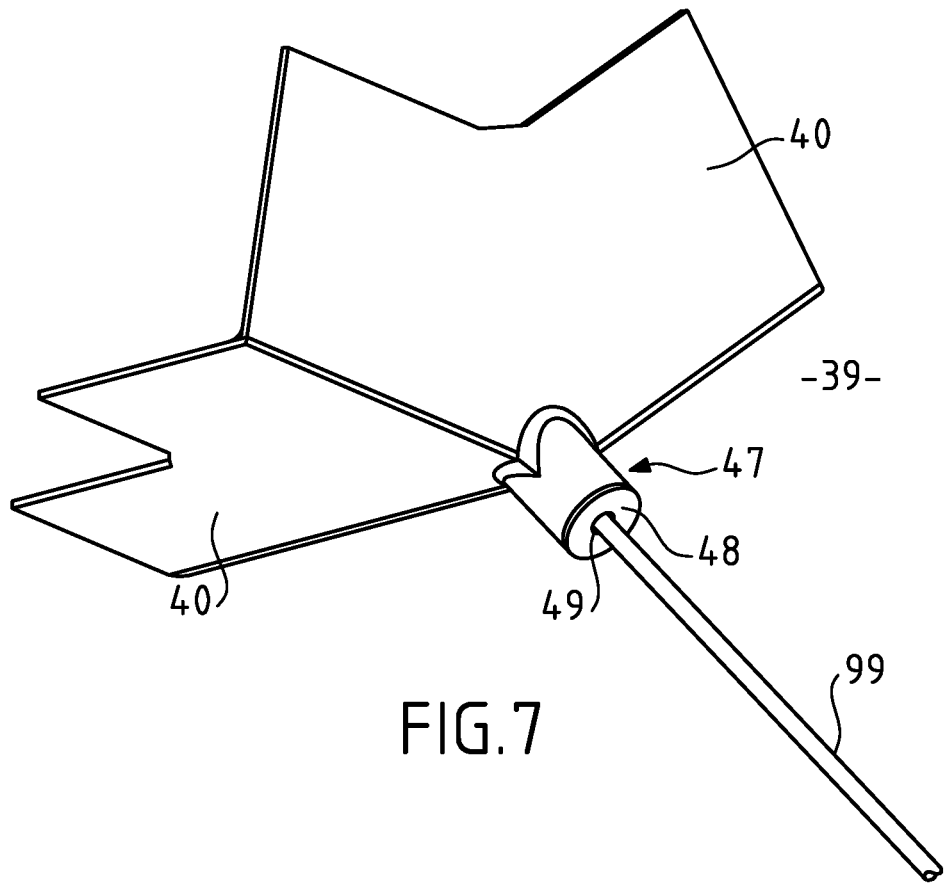
FIG. 7 is a schematic perspective view from below of the angle piece in FIG. 6 forming the sealed membrane corner.

FIG. 7 is a schematic perspective view from below of the corner piece 39 forming the sealed membrane corner. The corner piece 39 comprises a hollow cylindrical base 47 an internal opening of which opens in the corner formed by the point of connection of the three corner flanges 40. This cylindrical base 47 comprises a bottom 48 perforated by a through-orifice 49.

When the tank is fabricated, a corner anchor rod 99 extending in a central direction of the solid angle formed by the corner of the bearing structure is welded onto the bearing structure in said corner of the bearing structure. To this end, an anchor plate (not depicted) extending in a plane perpendicular to the direction of the corner anchor rod 99 is fixed to a first end of said corner anchor rod 99. Edges of this anchor plate are then welded onto respective bearing walls forming said corner in order to anchor the corner anchor rod on the bearing structure at its first end.

When the corner piece 39 is installed on the corner insulating elements 38, a second end of the corner rod 99 opposite the first end of the corner rod is inserted into the cylindrical base 47 through the through-orifice 49 in the bottom 48 of the cylindrical base 47 in such a way as to project into the internal space of said cylindrical base 47. A nut is then fixed onto this second end of the corner anchor rod in the internal space of the cylindrical base 47 in order to couple said cylindrical base 47 on the corner anchor rod.

A metal corner plate 50 such as illustrated in FIG. 6 is then attached and welded in a sealed manner on the corner piece 39 at the cylindrical base 47 in order to close in a sealed manner said cylindrical base 47 and ensure sealing of the corner piece in the corner of the sealed membrane.

As shown in FIG. 6, an end angle bracket 42 in the row of angle brackets 9 lies both on the corner insulating element 38 and an end edging insulating element adjacent to said corner insulating element 38.

This end angle bracket 42 has, at its end closest to the corner, two tabs 33 projecting in the direction of the longitudinal bearing wall 2. Furthermore, this end angle bracket 42 fully covers a cut-out 43 of the groove 41 similar to the cut-out 29 of the edging insulating elements 5. In other words, the edge 44 at the end of the end angle bracket 42 from which said two tabs 33 housed in the groove 41 project lies on the corner milling beyond the groove 41 of the corner insulating element 38.

Moreover, an anchor rod 12 is housed in the groove 41 of the corner insulating element 38 and is coupled to the two tabs 33 of the end angle bracket 42 housed in said groove 41 in order to anchor the end angle bracket 42 on the transverse bearing wall 3.

Figure 8:
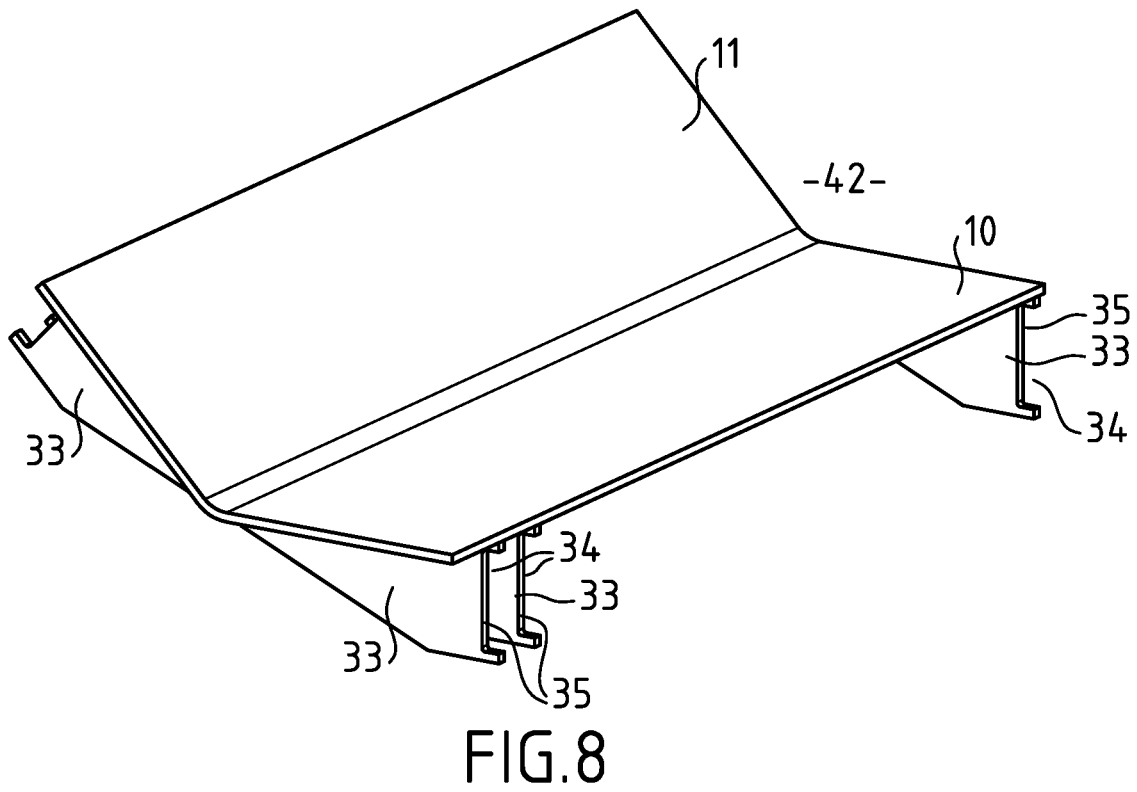
FIG. 8 is a schematic perspective view of an end angle bracket in the row of angle brackets intended to collaborate with a corner insulating element.

An end angle bracket 42 in the context of a 135° edge corner of the bearing structure is shown schematically in FIG. 8 and shows that the end of said end angle bracket 42 has two tabs 33 projecting from the first flange 10 in order to collaborate with the end anchor rod housed in the corresponding corner insulating element 38.

In a mode of embodiment which is not depicted, the end angle bracket 42 is identical to the other angle brackets 9 in the row of angle brackets 9 and has only one tab 33 housed in the groove 41 of the corner insulating element 38, this single tab 33 being coupled to the anchor rod 12 housed in said groove 41.

The corner flange 40 lies in the corner milling of the corner insulating element 38. This corner flange extends and is flush with the end angle bracket 42. A corrugated connecting piece 36 such as described above is fixed in a sealed manner, for example by lap welding, both on the end angle bracket 42 and the corner flange 40.

Figure 9:
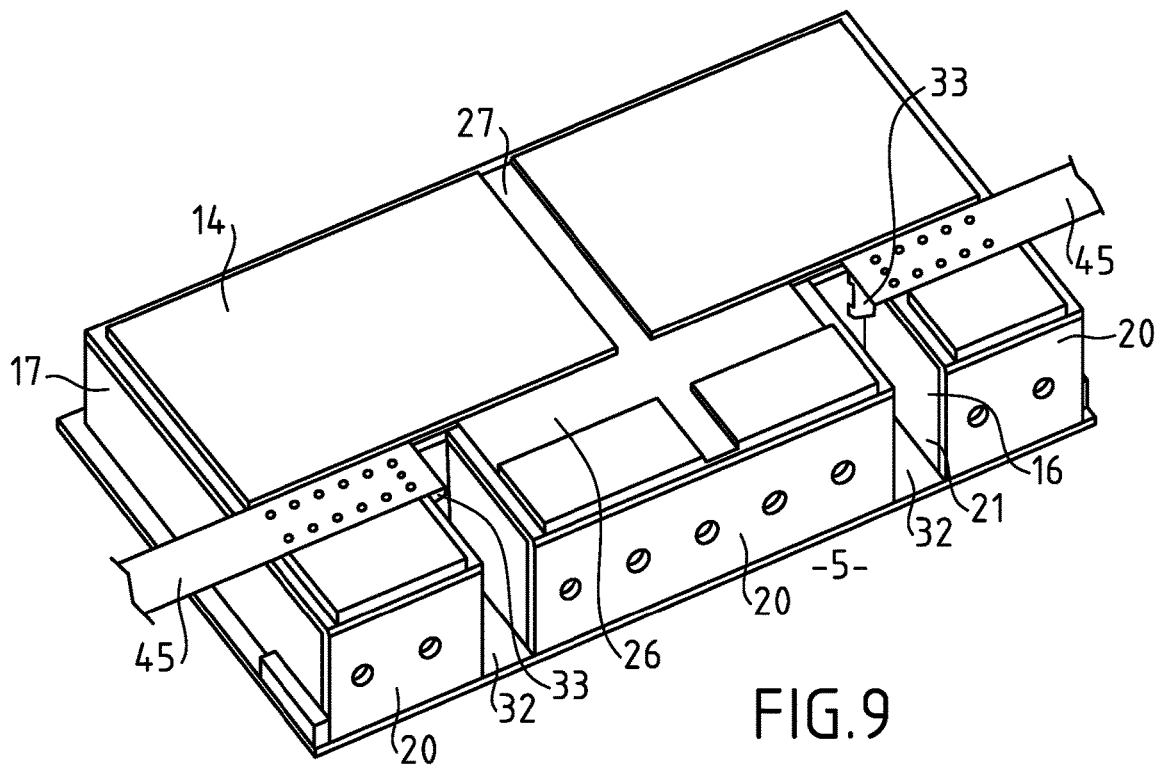
FIG. 9 is a schematic perspective view of an edging insulating element according to a variant embodiment.

FIG. 9 shows an edging insulating element 5 according to a second mode of embodiment which differs from the first mode of embodiment shown in FIGS. 1 to 6 in that the angle brackets 9 are replaced by transverse anchor strips 45 retained in a sealed manner by angle pieces attached thereon as described in document WO2017064413. Elements which are identical to or have the same function as elements described above in relation to FIGS. 1 to 8 bear the same reference symbols.

In this second mode of embodiment, the transverse milling 26 of an edging insulating element 5 does not extend from the second transverse side of said edging insulating element 5. This transverse milling 26 is for example located at a distance, taken perpendicularly with the transverse wall 3 of the second transverse side, substantially equal to one third of the width of the edging insulating element 5 in said direction. The longitudinal milling 27 itself extends from the first transverse side as far as the second transverse side over the whole width of the edging insulating element in a direction perpendicular to the transverse bearing wall.

Figure 10:
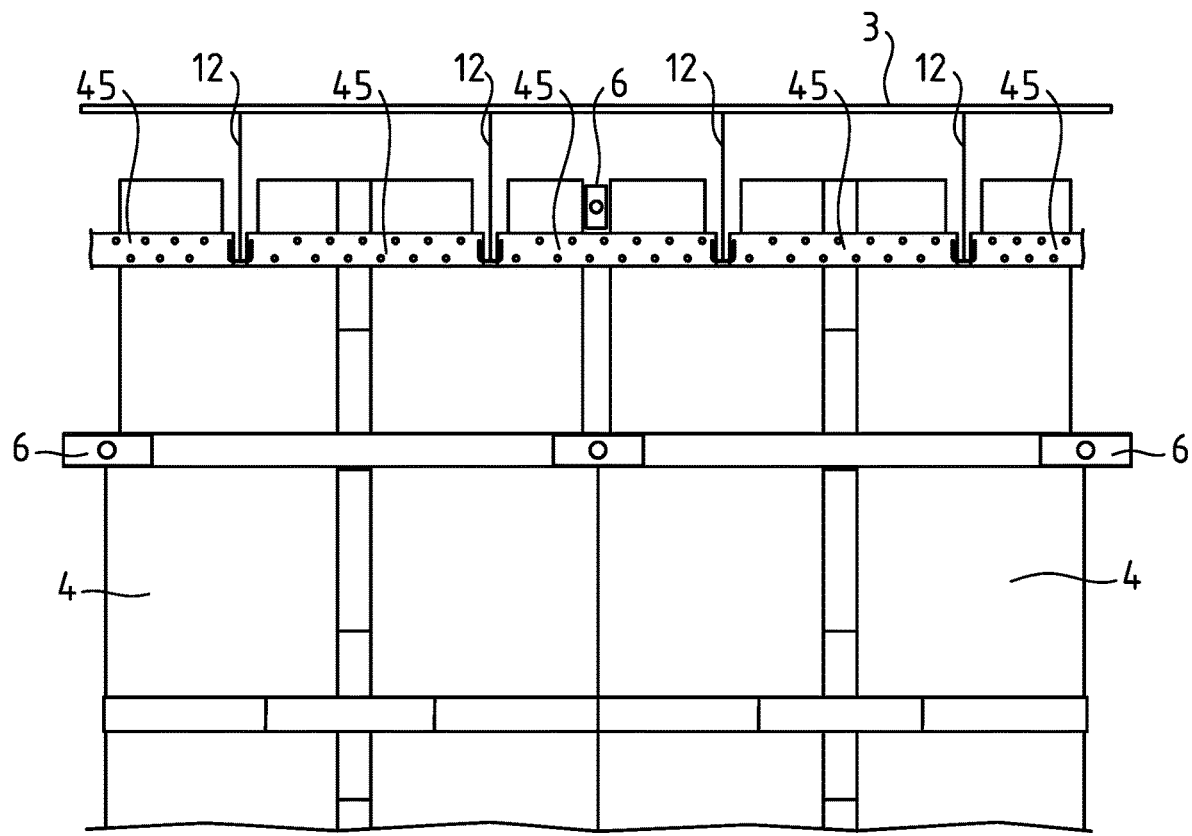
FIG. 10 is a plan view of a barrier of a longitudinal wall of a sealed and thermally insulating tank at one edge corner with a transverse wall of the tank in which the sealed membrane is not illustrated so as to show the collaboration of the anchor strips with the anchor rods in this variant embodiment.

As shown in FIG. 10, this second mode of embodiment comprises a row of transverse anchor strips 45 each having a structure similar to the anchor strips described in document WO2017064413, which is to say that these transverse anchor strips 45 have two opposing ends folded over to form tabs 33 extending in the direction of the longitudinal bearing wall. These transverse anchor strips 45 are planar and extend parallel to the edge corner 1 at a distance from the second transverse side of the edging insulating elements on which they lie. In other words, each transverse anchor strip 45 lies only on a single row of edging insulating elements 5 and does not extend parallel to a sealed membrane of a single tank wall.

These transverse anchor strips 45 have a length in a direction parallel to the edge corner 1 substantially equal to half of the length taken along this direction of the edging insulating elements 5. Thus, in a similar way to the angle brackets 9 described above in relation to FIGS. 1 to 8, the row of transverse anchor strips 45 includes alternating transverse anchor strips 45 borne by a single edging insulating element 5 and transverse anchor strips 45 borne jointly by two adjacent edging insulating elements 5.

Likewise, the tabs 33 of each transverse anchor strip 45 are housed in two adjacent grooves 32 along the edge corner, whether these two adjacent grooves 32 are formed in the same edging insulating element 5 or in two adjacent edging insulating elements 5. FIG. 10 moreover schematically shows collaboration between the anchor rods 12 and the tabs 33 of the different anchor strips 45, this collaboration being similar to the collaboration between the tabs 33 of the angle brackets 9 and the anchor rods 12 in FIGS. 1 to 8.

In order to ensure continuity of the sealed membrane at the edge corner 1, a row of metal angle pieces is disposed on the edging insulating elements 5 which are perpendicular to the line of the edge corner 1. Such a row of metal angle pieces is for example described in document WO2017064413 and is aligned along the edge corner 1, each metal angle piece having two flanges each extending parallel to one of the bearing walls 2, 3 forming the edge corner 1. These angle pieces are welded in pairs along the edge corner 1 in order to ensure sealing of the sealed membrane in line with the edge corner 1. Furthermore, these metal angle pieces and the sealed membranes of the tank walls are welded on the transverse anchor strips 45 in such a way as to connect in a sealed manner said sealed membranes of the tank walls in line with the edge corner 1.

Thus, in this mode of embodiment, the transverse anchor strips 45 and the metal angle pieces together fulfil the same function as an angle bracket 9 as described above in relation to FIGS. 1 to 8.

In a variant which is not depicted, the transverse anchor strips 45 have a length taken parallel to the edge corner 1 substantially equal to the length of the edging insulating elements 5. Each edging insulating element 5 has a single groove 32 substantially centred on said edging insulating element 5. The transverse anchor strip 45 is then arranged so as to overlap two adjacent edging insulating elements 5 in such a way that the tabs 33 of the transverse anchor strips 45 are housed in a groove 32 of one of said edging insulating elements 5 which it overlaps.

The technique described above for constructing a tank having a single sealed membrane may be used in different types of containers, for example for forming a double-membrane tank for liquefied natural gas (LNG) in an onshore facility or in a floating structure such as a methane tanker or the like. In this context, it may be considered that the sealed membrane shown in the previous drawings is a secondary sealed membrane, and that a primary insulating barrier as well as a primary sealed membrane, not depicted, must still be added to this secondary sealed membrane. In this way, this technique may also be applied to tanks having a plurality of thermally insulating barriers and sealed membranes overlaid.

Figure 11:
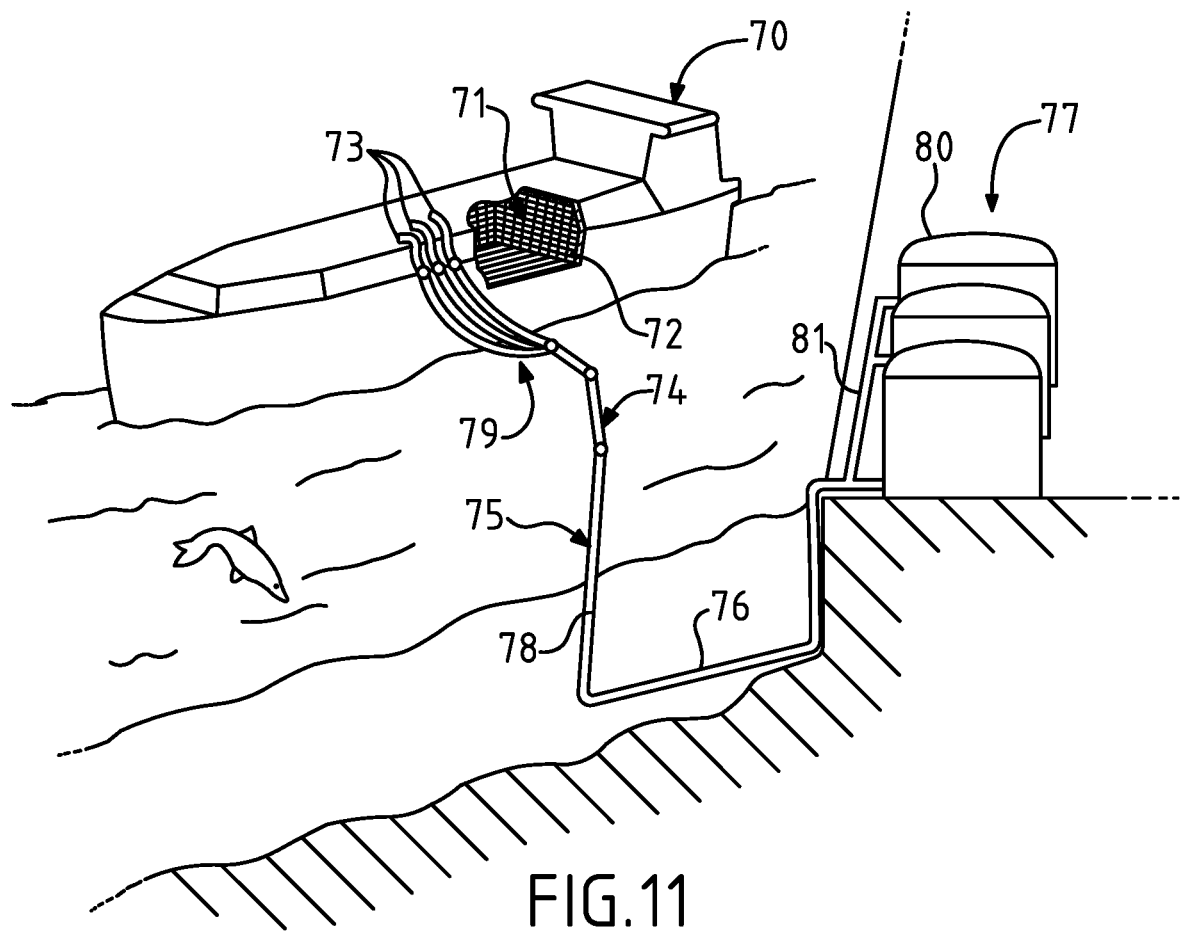
FIG. 11 is a schematic cutaway depiction of a tank of a methane tanker and of a terminal for loading/offloading this tank.

Referring to FIG. 11, a cutaway view of a methane tanker 70 shows a sealed and insulated tank 71 having a generally prismatic shape mounted in the double hull 72 of the ship. The wall of the tank 71 comprises a primary sealed barrier intended to be in contact with the LNG contained in the tank, a secondary sealed barrier arranged between the primary sealed barrier and the double hull 72 of the ship, and two insulating barriers arranged respectively between the primary sealed barrier and the secondary sealed barrier and between the secondary sealed barrier and the double hull 72.

In a manner which is known per se, loading/offloading pipelines 73 disposed on the top deck of the ship may be connected, by means of suitable connectors, to a maritime or harbour terminal in order to transfer a cargo of LNG from or to the tank 71.

FIG. 11 depicts one example of a maritime terminal comprising a loading and offloading station 75, an underwater pipe 76 and an onshore facility 77. The loading and offloading station 75 is a fixed offshore facility comprising a mobile arm 74 and a tower 78 supporting the mobile arm 74. The mobile arm 74 carries a bundle of insulated flexible conduits 79 that can be connected to the loading/offloading pipelines 73. The orientable mobile arm 74 adapts to suit all sizes of methane tanker. A connecting pipe, not depicted, extends inside the tower 78. The loading and offloading station 75 allows the methane tanker 70 to be loaded and offloaded from or to the onshore facility 77. The latter comprises liquefied gas storage tanks 80 and connecting pipes 81 connected by the underwater pipe 76 to the loading or offloading station 75. The underwater pipe 76 allows the transfer of liquefied gas between the loading or offloading station 75 and the onshore facility 77 over a long distance, for example 5 km, making it possible to keep the methane tanker 70 a long way away from the shore during the loading and offloading operations.

In order to generate the pressure required for the transfer of the liquefied gas, use is made of pumps carried onboard the ship 70 and/or pumps with which the onshore facility 77 is equipped and/or pumps with which the loading and offloading station 75 is equipped.

Although the invention has been described in conjunction with a number of particular modes of embodiment, it is quite obvious that it is not in any way restricted thereto and that it comprises all the technical equivalents of the means described and combinations thereof where these fall within the scope of the invention.

In particular, a single thermally insulating barrier and a single sealed membrane are shown and described above, but the sealed and thermally insulating tank may comprise two thermally insulating barriers and two sealed membranes alternately overlaid. Thus the thermally insulating barrier and the sealed membrane described above may constitute a secondary thermally insulating barrier and a secondary sealed membrane of such a tank, a primary thermally insulating barrier lying on said secondary sealed membrane and a primary sealed membrane lying on the primary thermally insulating barrier.

The use of the verbs "comprise", "have" or "include" and conjugated forms thereof does not exclude there being elements or steps other than those listed in a claim.

In the claims, any reference sign between parentheses should not be interpreted as placing a limit on the claim.

The invention claimed is:

1. A sealed and thermally insulating tank incorporated into a polyhedral bearing structure, a first bearing wall (2) of the bearing structure and a second bearing wall (3) of the bearing structure forming an edge corner (1) of the bearing structure, the tank comprising a first tank wall anchored on the first bearing wall and a second tank wall anchored on the second bearing wall, the tank walls comprising a thermally insulating barrier anchored on the corresponding bearing wall and a sealed membrane borne by said thermally insulating barrier, the tank further comprising an angle bracket (9), the angle bracket (9) comprising a first flange (10) borne by the thermally insulating barrier of the first tank wall and a second flange (11) borne by the thermally insulating barrier of the second tank wall, an end portion of the sealed membrane of the first tank wall turned towards the edge corner (1) being fixed in a sealed manner to the first flange (10) of the angle bracket (9) and an end portion of the sealed membrane of the second tank wall turned towards the edge corner (1) being fixed in a sealed manner to the second flange (11) of the angle bracket (9) in such a way that the angle bracket (9) connects in a sealed manner the sealed membrane of the first tank wall and the sealed membrane of the second tank wall in line with the edge corner (1), in which the angle bracket (9) comprises a pair of first tabs (33) each projecting from a respective end portion of the first flange (10) in the direction of the first bearing wall (2) and a pair of second tabs (33) each projecting from a respective end portion of the second flange (11) in the direction of the second bearing wall (3), the tank comprising a pair of first anchor rods (12) each comprising a first end and a second end opposite the first end, said first end being anchored to the second bearing wall (3) and said second end being coupled to a respective first tab (33) of the pair of first tabs (33), one said first anchor rod (12) extending from the second bearing wall (3) in the direction of the corresponding first tab (33) in order to transmit a tensile load between the angle bracket (9) and the second bearing wall (3) and retain the angle bracket (9) on the thermally insulating barrier, the tank further comprising a pair of second anchor rods (12) each comprising a first end and a second end opposite the first end, said first end being anchored on the first bearing wall (2) and said second end being coupled to a respective second tab (33) of the pair of second tabs (33), one said second anchor rod (12) extending from the first bearing wall (2) in the direction of the corresponding second tab (33) in order to transmit a tensile load between the angle bracket (9) and the first bearing wall (2) and retain the angle bracket (9) on the thermally insulating barrier.

2. The sealed and thermally insulating tank according to claim 1, in which the flanges (10, 11) and the tabs (33) of the angle bracket (9) are formed from a single element in such a way that the angle bracket (9) is one-piece.

3. The sealed and thermally insulating tank according to claim 1, in which one said first tab (33) projects from a lower face of the first flange (10) facing the first bearing wall (2) at a distance from a lateral edge of the first flange (10) of the angle bracket (9) forming one end of the first flange (9), and in which one said second tab (33) projects from a lower face of the second flange (11) facing the second bearing wall (3) at a distance from a lateral edge of the second flange (11) of the angle bracket (9) forming one end of the second flange (11).

4. The sealed and thermally insulating tank according to claim 1, in which a longitudinal edge of the first flange (10) parallel to the edge corner (1) projects beyond the first tabs (33) in a direction perpendicular to the second bearing wall (3) in such a way that said longitudinal edge of the first flange (10) is further from the second bearing wall (3) than said first tabs (33) in said direction perpendicular to the second bearing wall (3), and in which a longitudinal edge of the second flange (11) parallel to the edge corner (1) projects beyond the second tabs (33) in a direction perpendicular to the first bearing wall (2) in such a way that said longitudinal edge of the second flange (11) is further from the first bearing wall (2) than said second tabs (33) in said direction perpendicular to the first bearing wall (2).

5. The sealed and thermally insulating tank according to claim 1, in which the thermally insulating barrier of the first tank wall forms a first support surface on which the sealed membrane of the first tank wall lies, and in which the thermally insulating barrier of the first tank wall forms a first milling (26) arranged at one end of the first support surface turned towards the edge corner (1), the first flange (10) of the angle bracket (9) being housed in said first milling (26) in such a way that an upper face of the first flange (10) of the angle bracket (9) is flush with the first support surface, and in which the thermally insulating barrier of the second tank wall forms a second milling (26) arranged at one end of the second support surface turned towards the edge corner (1), the second flange (11) of the angle bracket (9) being housed in said second milling (26) in such a way that an upper face of the second flange (11) of the angle bracket (9) is flush with the second support surface.

6. The sealed and thermally insulating tank according to claim 1, comprising a row of angle brackets (9) juxtaposed and connected in a sealed manner in pairs along the edge corner (1), several angle brackets in the row of angle brackets comprising a first flange (10) borne by the thermally insulating barrier of the first tank wall and a second flange (11) borne by the thermally insulating barrier of the second tank wall, an end portion of the sealed membrane of the first tank wall turned towards the edge corner (1) being fixed in a sealed manner to the first flange (10) of said angle brackets (9) and an end portion of the sealed membrane of the second tank wall turned towards the edge corner (1) being fixed in a sealed manner to said second flange (11) of said angle brackets in such a way that said angle brackets (9) connect in a sealed manner the sealed membrane of the first tank wall and the sealed membrane of the second tank wall in line with the edge corner (1), in which one said angle bracket (9) comprises a pair of first tabs (33) each projecting from a respective end portion of the first flange (10) of said angle bracket (9) in the direction of the first bearing wall (2) and a pair of second tabs (33) each projecting from a respective end portion of the second flange (11) of said angle bracket (9) in the direction of the second bearing wall (3), the tank comprising a row of first anchor rods (12) each comprising a first end and a second end opposite the first end, a plurality of first anchor rods in the row of first anchor rods having a said first end anchored to the second bearing wall (3) and a said second end coupled to at least one first tab (33) of at least one angle bracket (9) in the row of angle brackets (9), said first anchor rods (12) extending from the second bearing wall (3) in the direction of said at least one first tab (33) in order to transmit a tensile load between said at least one angle bracket (9) and the second bearing wall (3) and retain said at least one angle bracket (9) on the thermally insulating barrier, the tank further comprising a row of second anchor rods (12) each comprising a first end and a second end opposite the first end, a plurality of second anchor rods in the row of second anchor rods having a said first end anchored on the first bearing wall (2) and a said second end coupled to at least one second tab (33) of at least one angle bracket (9) in the row of angle brackets (9), said second anchor rods (12) extending from first bearing wall (2) in the direction of said at least one second tab (33) in order to transmit a tensile load between said at least one angle bracket (9) and the first bearing wall (2) and retain said at least one angle bracket (9) on the thermally insulating barrier.

7. The sealed and thermally insulating tank according to claim 6, in which the second end of one said anchor rod (12) is jointly coupled to two anchor tabs (12) belonging to two adjacent angle brackets (9) in said row of angle brackets (9) in order to retain said two adjacent angle brackets (9) on the thermally insulating barrier.

8. The sealed and thermally insulating tank according to claim 1, in which the thermally insulating barrier of the first tank wall comprises a row of first edging blocks (5) anchored on the first bearing wall (2) and juxtaposed along the edge corner (1), at least two of said first edging blocks (5) comprising a groove (32) formed in the thickness of the first edging block (5) from an upper face of the first edging block (5) in such a way as to form a space accessible from the second bearing wall (3) in the first edging block (5), the anchor rods (12) of said pair of first anchor rods (12) each being housed in the grooves (32) of the two first edging blocks (5), the first flange (10) of the angle bracket (9) being disposed overlapping said two first edging blocks (5) in such a way that the first tabs (33) of said angle bracket (9) project into said grooves (32) of the two edging blocks (5).

9. The sealed and thermally insulating tank according to claim 8, in which at least one of the first edging blocks (5) comprises:
   a bottom panel (13) which is rectangular overall,
   a cover panel (14) which is rectangular overall disposed parallel to the bottom panel (13) plumb with the bottom panel (13),
   spacer elements (16), disposed between the bottom panel (13) and the cover panel (14) and extending in a thickness direction of the edging block (5) between the bottom panel (13) and the cover panel (14) in such a way as to keep the cover panel (14) at a distance from the bottom panel (13),
   an insulating filling (15) disposed between the bottom panel (13) and the cover panel (14) and between the spacer elements (16), in such a way as to fill an internal space of the edging block (5),
   in which the cover panel (14) has at least one cut-out (29) opening on a transverse edge of the cover panel (14) facing the second bearing wall (3) at a position located between two longitudinal edges of the cover panel (14), a transverse side of the edging block (5) facing the second bearing wall (3) comprising at least one opening (21) located in line with said at least one cut-out (29),
   the spacer elements (16) and the insulating filling (15) being disposed in such a way as to form a free space under said at least one cut-out (29) of the cover panel (14) and in line with said at least one opening (21) on the transverse side of the edging block (5), said free space forming the groove (32) formed in the thickness of said edging block (5).

10. The sealed and thermally insulating tank according to claim 1, in which the thermally insulating barrier of the second tank wall comprises a row of second edging blocks (5) anchored on the second bearing wall (3) and juxtaposed along the edge corner (1), at least two of said second edging blocks (5) each comprising a groove (32) formed in the thickness of the second edging block (5) from an upper face of the second edging block (5) in such a way as to form a space accessible from the first bearing wall (2) in the second edging block (5), the anchor rods (12) of said pair of second anchor rods (12) each being housed in the grooves (32) of the two second edging blocks (5), the second flange (11) of one angle bracket (9) being disposed overlapping the two second edging blocks (5) in such a way that the second tabs (33) of said angle bracket (9) project into said grooves (32) of the two second edging blocks (5).

11. The sealed and thermally insulating tank according to claim 1, in which the bearing structure comprises a third bearing wall on which is anchored the thermally insulating barrier of a third tank wall, said third tank wall comprising a sealed membrane lying on the thermally insulating barrier of said third tank wall, the third bearing wall forming with the first bearing wall and the second bearing wall a corner of the bearing structure located at an end of said edge corner (1),
   the tank comprising a sealed corner piece (39) comprising a first flange (40) lying on the thermally insulating barrier of the first tank wall, a second flange (40) lying on the thermally insulating barrier of the second tank wall and a third flange (40) lying on the thermally insulating barrier of the third tank wall, the corner piece (39) being adjacent to a last angle bracket (42) in the row of angle brackets (9), the first flange (10) of the last angle bracket (42) being connected in a sealed manner to the first flange (40) of the corner piece (39) and the second flange (11) of the last angle bracket (42) being connected in a sealed manner to the second flange (40) of the corner piece (39).

12. The sealed and thermally insulating tank according to claim 11, further comprising a corner anchor rod (99) having a first end anchored on the bearing structure in the corner of the bearing structure and a second end attached to the corner piece (39) in order to transmit a tensile load between the corner piece (39) and the bearing structure and retain the corner piece (39) on the thermally insulating barriers of the first, second and third tank walls, said corner anchor rod (99) extending in a central direction of the solid angle formed by the corner of the bearing structure and being attached to a central zone of the corner piece (39) located at the point of connection between the first, second and third flanges of the corner piece (39).

13. The sealed and thermally insulating tank according to claim 11, in which the last angle bracket (42) comprises, at an end of the first flange (10) connected in a sealed manner to the first flange of the corner piece (39), a third tab, a last first anchor rod in the row of first anchor rods being coupled to one of the tabs of the pair of tabs of the first flange located at said end of said first flange and to said third tab, and in which the last angle bracket (42) comprises, at an end of the second flange (11) connected in a sealed manner to the second flange of the corner piece (39), a fourth tab, a last second anchor rod in the row of second anchor rods being coupled to one of the tabs of the pair of tabs of the second flange located at said end of said flange and to said fourth tab.

14. A ship (70) for transporting a cold liquid product, the ship comprising a double hull (72) and a tank (71) according to claim 1 disposed in the double hull.

15. A method for loading or offloading a ship (70) according to claim 14, in which a cold liquid product is conveyed through insulated pipelines (73, 79, 76, 81) from or to a floating or onshore storage facility (77) to or from the tank (71) of the ship.

16. System for transferring a cold liquid product, the system comprising a ship (70) according to claim 14, insulated pipelines (73, 79, 76, 81) arranged in such a way as to connect the tank (71) installed in the hull of the ship to a floating or onshore storage facility (77) and a pump for causing a cold liquid product to flow through the insulated pipelines from or to the floating or onshore storage facility to or from the tank of the ship.

* * * * *